United States Patent [19]
Lionts et al.

[11] 3,878,913
[45] Apr. 22, 1975

[54] GENERATING SYSTEM FOR AN ELECTRIC VEHICLE

[75] Inventors: Donald C. Lionts, Madison Heights; George W. Armijo, Detroit; Bernard F. Mehall, Royal Oak, all of Mich.

[73] Assignee: CLC Corporation, Detroit, Mich.

[22] Filed: Dec. 15, 1972

[21] Appl. No.: 315,348

[52] U.S. Cl................................ 180/65 R; 290/44
[51] Int. Cl............................................. B60k 1/00
[58] Field of Search ............ 180/65 R, 65 A, 65 F; 244/58; 290/44, 55; 416/166; 415/129, 130

[56] References Cited
UNITED STATES PATENTS

| | | | |
|---|---|---|---|
| 554,138 | 2/1896 | Feely | 290/44 |
| 2,383,004 | 8/1945 | Mader | 415/130 X |
| 2,397,183 | 3/1946 | Kilgore et al. | 416/166 X |
| 2,675,761 | 4/1954 | Peterson | 415/129 X |
| 2,941,613 | 6/1960 | Di Perna | 180/65 R |
| 3,275,198 | 9/1966 | Barlow | 416/166 X |
| 3,374,849 | 3/1968 | Redman | 180/65 R |
| 3,444,946 | 5/1969 | Waterbury | 180/65 R |
| 3,476,201 | 11/1969 | Swaine | 180/65 R |
| 3,513,326 | 5/1970 | Potts | 180/65 R UX |
| 3,530,356 | 9/1970 | Aronson | 180/65 R |
| 3,556,239 | 1/1971 | Spahn | 180/65 A |
| 3,716,767 | 2/1973 | Kuriyama et al. | 180/65 R X |

*Primary Examiner*—David Schonberg
*Assistant Examiner*—David M. Mitchell
*Attorney, Agent, or Firm*—Cullen, Settle, Sloman & Cantor

[57] ABSTRACT

The vehicle, typically for on-land locomotion, is driven electrically by a plurality of batteries which are substantially continuously re-charged in all phases of road travel through direct current generator and motor-connected electrical circuitry, a generator of which is mechanically driven in normal level grade and uphill road travel by a large capacity radially bladed fan unit, through which a similarly large capacity forward air scoop directs a travel-occasioned stream of air. The fan-to-generator drive connection is through the agency of a weighted flywheel operatively and coaxially connected forwardly to the fan and rearwardly through reduction gearing to the generator shaft; and an overrunning or freewheeling type of clutch overdrive unit is interposed axially between the fan and flywheel. The vehicle momentum is regeneratively employed to continue battery charging. All of this is under the timed control of a D. C. chopper circuit responsive to accelerator and brake pedal potentiometer means.

5 Claims, 15 Drawing Figures

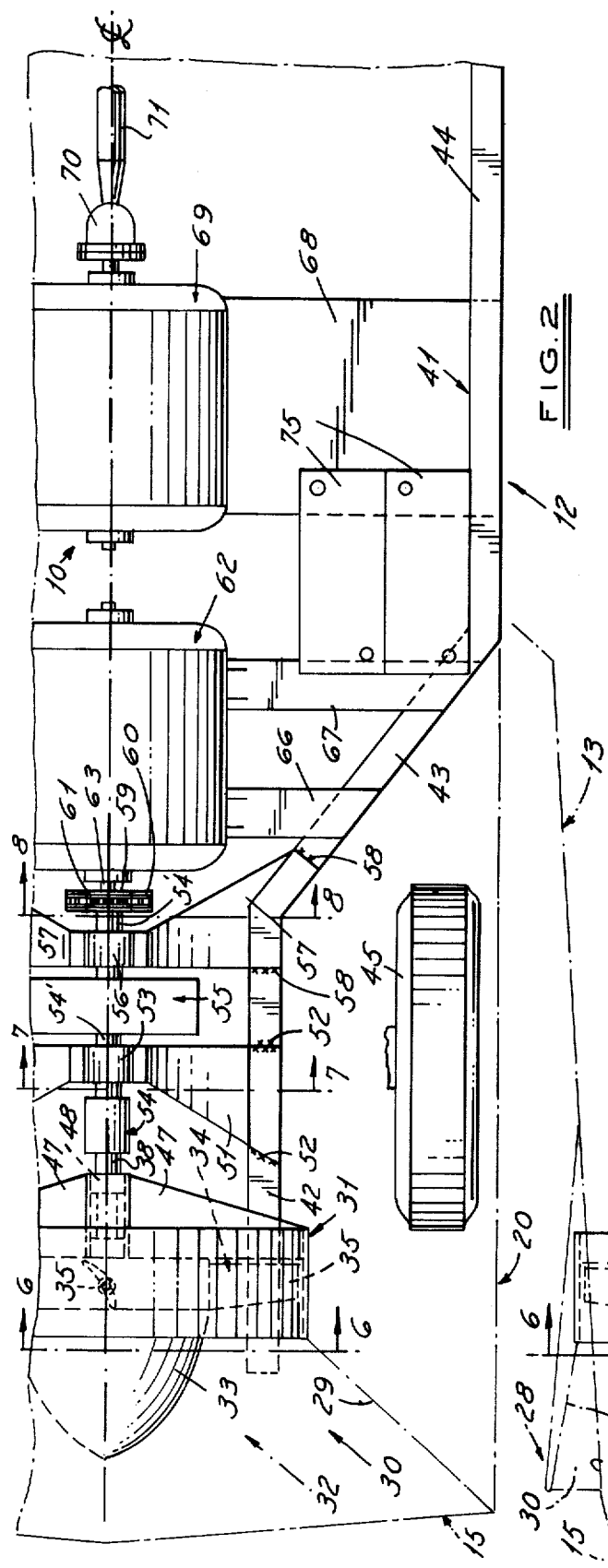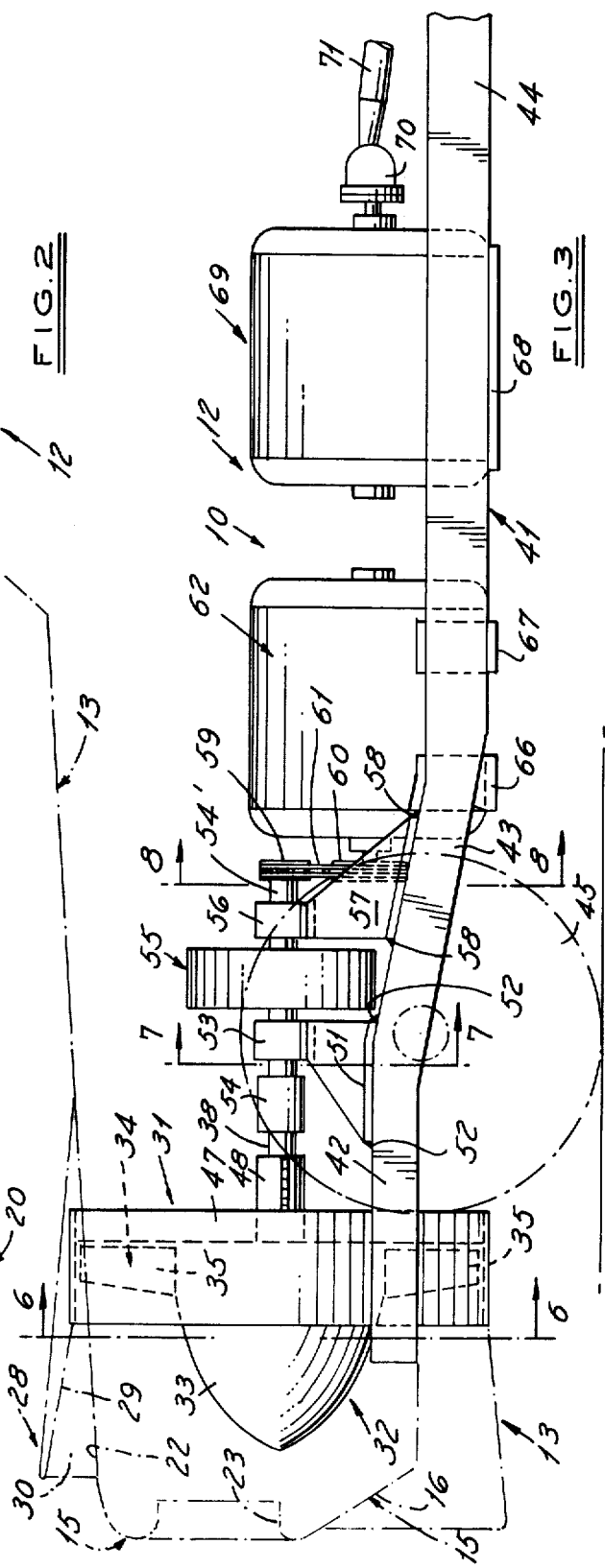

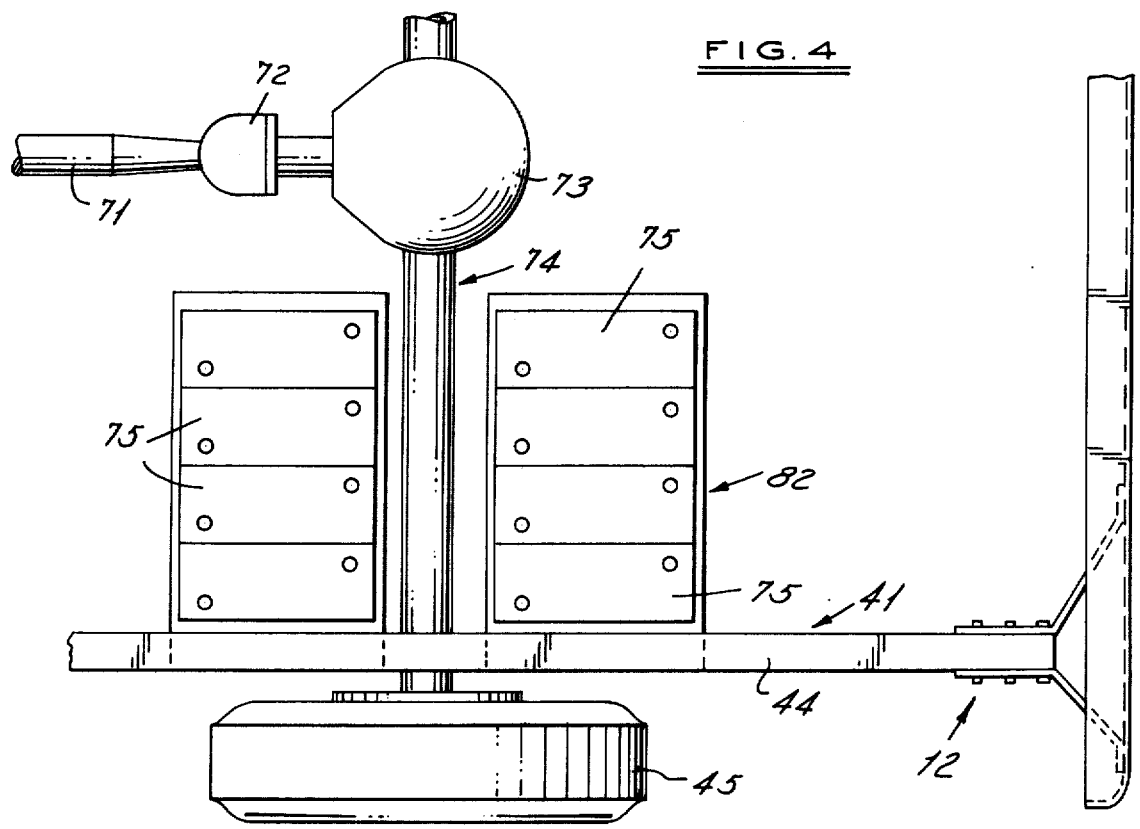
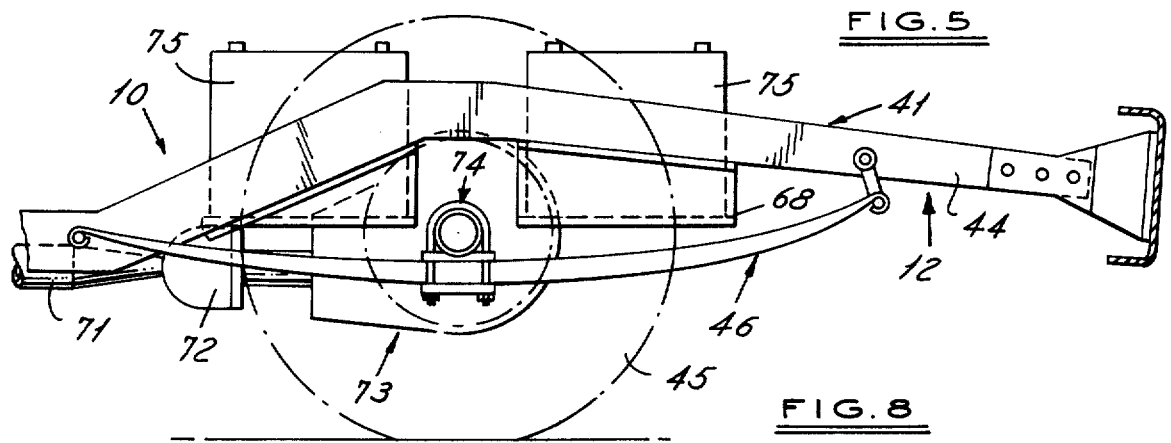
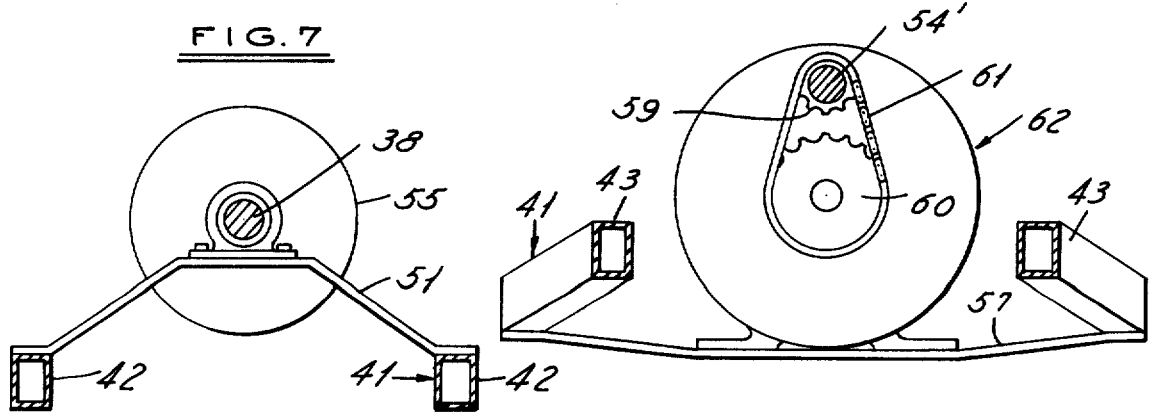

GENERATING SYSTEM FOR AN ELECTRIC VEHICLE

BACKGROUND OF THE INVENTION

1. Field of the Invention

As indicated in the Abstract, the improvement finds a most common present application in road or rail vehicles customarily moving at a rate of speed sufficient to generate a fan operating torque capable of driving a generator through a clutch, flywheel and reduction gear sub-assembly. However, applications in other types of vehicle, i.e., waterborne or airborne, as well as in electrically powered installations of a non-vehicular nature having an equivalent of a fan derived operating torque, are contemplated.

2. Description of the Prior Art

A search has revealed the patents to Diperna, U.S. Pat. No. 2,941,613 of June 21, 1960, and Waterbury, U.S. Pat. No. 3,444,946 of May 20, 1969, neither of which shows or suggests various inventive aspects of the present improvement, basically but not solely, for example, in its clutch and flywheel-governed transmission of generator driving power from a rotary fan, its arrangement of a high capacity intake scoop air supply to and through the fan housing, etc.

SUMMARY OF THE INVENTION

The electric drive and generating system or structure of the invention enables a continuous charging by the fan-driven generator of the system of a relatively limited number and size of electrical batteries, by which conventional drive motor means of the installation have electrical energization. This continuous recharging occurs during and after an interruption in the normal road travel of the vehicle, in the first of which the batteries are using current supplemented by the generator, and in the other modes or phases in which the vehicle is either on a downhill coasting or braked slowing course, the batteries thus not using current, but still being regeneratively charged from the continuingly rotated motor and fan-driven generator.

To this end, an overdrive, overrunning or freewheel type clutch or coupling transmits the normal driving torque to the electrical generator through the agency of an adequately sized flywheel, decoupling the latter from the operator fan and allowing the flywheel to independently drive the generator in the non-current consuming phase or mode just mentioned. The driving arrangements are very simple in nature, compact and relatively inexpensive, being substantially foolproof in operation and requiring little or no maintenance. Superimposed on the essential battery charging feature of the invention is a silicon-controlled rectifier type chopper circuit which effects a high-speed "on" and "off" switching of motor current as a means of varying motor current, voltage and speed under accelerator and brake pedal control.

Furthermore, the vehicle is contemplated as being fully equipped with all types of convenient service and safety means presently in common use, such as brakes, lights, directional signals, windshield wipers and washers, mirrors, speedometers, odometers, battery and generator charge gauges.

A major advantage of the improvement resides in the fact that it renders it unnecessary to stow a large number of expensive batteries of relatively short life into the vehicle in an attempt to get even nearly the reasonable mileage range essential to a modern day car owner. As for the operating fan it is contemplated that a fixed pitch or manually or automatically adjustable pitch type may be employed, enabling setting of the fan blades at a very flat pitch for slow driving, but at a high pitch for speeds above a certain mileage per hour, in order to prevent damaging overspeeding of either or both of the fan and the generator units. In this connection, the arrangement is such that fan powered recharging of the batteries will take place even if the vehicle is at rest and facing into a wind.

BRIEF DESCRIPTION OF THE DRAWINGS

FIG. 2 is a fragmentary and schematic top plan view essentially showing electrical generator, motor, fan, clutch, flywheel and reduction gear components of the invention, being symmetrical in reference to a horizontal front-to-rear centerline C/L;

FIG. 3 is a partial side elevational view of the assembly of FIG. 2;

FIG. 4 is a fragmentary top plan view supplementing FIG. 2 in showing battery, universal joint and differential drive components of the system;

FIG. 5 is a fragmentary side elevation similarly supplementing what is shown on FIG. 3;

FIGS. 6, 7 and 8 are views in transverse vertical section on lines respectively corresponding to lines 6—6, 7—7 and 8—8 of FIGS. 2 and 3;

DESCRIPTION OF A PREFERRED EMBODIMENT

Figure 1:
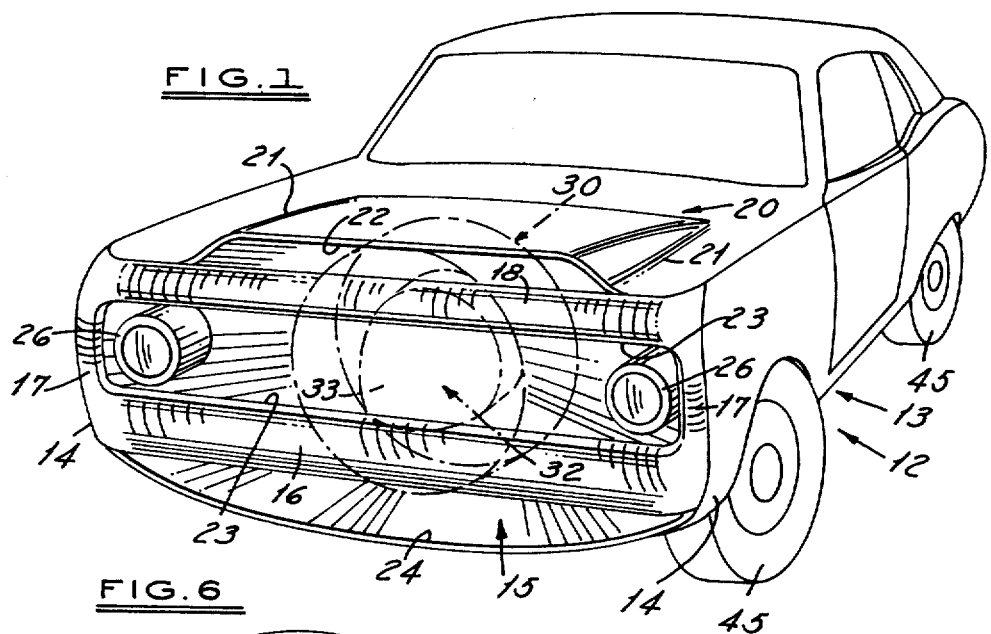
FIG. 1 is a perspective view showing an otherwise conventionally styled modern automotive vehicle which is equipped with electric motor means as powered by battery, generator and associated electrical circuitry under the basic drive of a fan sub-assembly, such as indicated in dot-dash line.

The system of the invention, as generally designated 10 in FIGS. 2 through 4 and 9, is by preference installed in an electrically powered automotive vehicle 12 (FIG. 1) of generally conventional modern day styling having a body structure which, along with components of system 10 is spring-supported on horizontally and vertically disposed steel frame components (hereinafter described) which are rigidly welded unitarily to one another.

As adapted for the purposes of the present invention, the electric automobile 12 affords a forward side body panel assembly 13 presenting forward and side sweep portions 14 in a graceful and attractive continuation of the body structure as a whole. These portions curve downwardly and centrally inwardly about an air scoop and fan housing space in which fan components of the system 10 are disposed in an arrangement and relationship to be described.

A front side-to-side and top-to-bottom extending panel portion of the forward panel assembly 13, as generally designated 15, constitutes one feature of improvement of the invention. It is constituted by a relatively massive and strong lower front bumper component 16 of attractively plated steel, which is coextensive in side-to-side dimension with the panel subassembly or portion 15 as a whole, and integrally merges through opposite upright side extensions 17 with a somewhat narrower but still strong and impact-resistant upper bumper component 18. Opposite sides and the top and bottom of bumper unite with and are welded or otherwise rigidly connected to corresponding portions of the forward body panel structure 13.

A hood or bonnet 20 of the forward body structure has meeting lines at 21 with said structure and this hood part is recessed upwardly and somewhat to the rear to in part define, in conjunction with the front bumper structure 15, an upper air inlet opening 22 of very generous area, coextensive in horizontal width with hood or bonnet unit 20.

Air inlet 22 is in effect defined at its bottom by the upper bumper cross component 18; and the latter in turn coacts with the lower and wider bumper component 16 in defining an even more generous sized air inlet opening 23. Finally, the lower margin of bottom bumper 16 is spaced sufficiently above the bottom of front panel unit 15 to outline still a third air inlet opening 24 of an area of the general order of that of the air inlet zones 22 and 23.

While it is contemplated that the said openings 22–24 shall be fully exposed forwardly and unimpeded as to air intake capacity in travel, as by screen or equivalent means, such means may indeed be provided in the interest of safety or of preventing entry of foreign objects. Headlamps 26 protected by the bumper structure 15 are conventionally energized through the circuitry of system 10.

Now referring to FIGS. 2 and 3, an air scoop 28 of sheet metal construction and rectangular walled cross section is welded to the automobile body structure directly to the rear of the air inlet and bumper structure 15. This scoop is of large air-handling capacity, presenting pairs of horizontally and vertically convergent wall portions 29, 30 which merge with the forward end of a large diameter sheet metal fan housing 31 encasing a single stage, radially bladed fan unit, generally designated by the reference numeral 32. As indicated in FIGS. 2 and 3, said unit presents an ogive-shaped spinner nose 33 behind and within which is the fan blading 34 and its variable pitch means, if employed.

The walls of the air scoop 28 are appropriately shaped for an air-tight welded connection to fan housing 31; and the proportioning of the dimensions of scoop 28 at its forward or intake end is such that its area is approximately the same order as the combined areas 22–24 of air inlet through the bumper-intake structure 15. Thus, a large volume air stream is trapped under the vehicle's road travel speed and compressed by the convergent-walled air scoop in entering fan housing 31, in traversing which it conventionally drives radial blades or vanes 35 of the fan structure 34.

Figure 6:
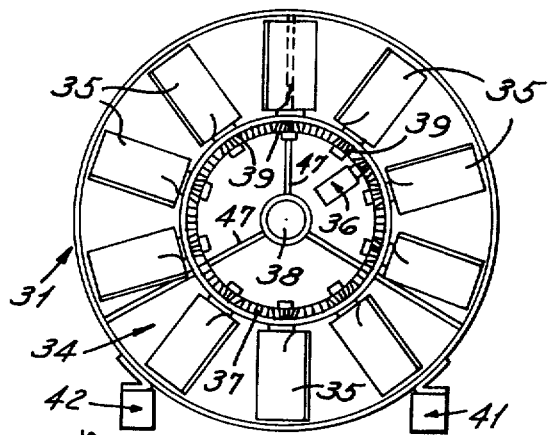

By preference, these blades are of the variable pitch type, automatically adjusted in on-the-road travel to positions in which they have a very flat individual angular pitch for slow driving, or a high pitch for speeds in excess of, say, 45/mph. For this purpose, the fan structure 34 is shown for utmost simplicity (FIG. 6) as being equipped with a manual mechanical or automatic control, schematically depicted in that figure as centrifugally responsive governor-type variable pitch device 36 within the spinner nose hub 33, by which a ring gear 37 rotatable on the shaft 38 of the fan 34 is automatically responsive to adjust the angular position of the several blades 35 about the respective individual axes thereof, acting through bevel gears 39 on said blades which mesh the ring gear 37.

However, in practice (and if fixed pitch fan blading is not preferred) either a fan manually adjustable as to blade pitch, such as the "Axivane" fan product of Joy Manufacturing Company, New Philadelphia Division of New Philadelphia, Ohio (Series 1000/2000 type for example), or the more refined automatically controllable pitch Axivane fan of the same producer is employed. The manually adjustable type is illustrated and described on pages 101 and 102 of an article by H. J. Novick in the publication "Heating, Piping and Air Conditioning" for July, 1968. The automatically controllable type is shown and described on pages 110–112 of the same publication, also on the last two pages of an article by Robert S. Merrin in a publication of said Joy Manufacturing Company.

The fan shaft 38 has a rugged anti-friction support on the frame or chassis structure, generally designated by the reference numeral 41, of the vehicle 12, as do other components of system 10. Typically, such structure may comprise a pair of parallel front-to-rear channels 42, from which a pair of similar channels 43 diverge rearwardly and downwardly, merging in turn with parallel rearmost channels 44. This structure is conventionally load-sustained by the wheels 45 of the vehicle through the agency of standard leaf springs 46 coupled in the manner shown in FIG. 5, and an independent front wheel suspension now in common use.

In supplementation of this basic support, radial transverse brackets 47 (FIGS. 2 and 3) are rigidly welded or otherwise secured outwardly to the fan housing 31 and inwardly to a combined radial and axial thrust bearing 48, which is thus fixed to the frame 41 as an anti-friction journal for the fan or impeller shaft 38. Heavy gauge steel bracket plates 51 are welded at 52 atop the parallel chassis channels 42 to rigidly support a conventional heavy duty bearing 53, which assists in journaling two important operating components of the system 10.

One of these is a conventional overdrive, overrunning or freewheeling clutch 54, for example of the sprag or roller and ramp type; and the other such component is an energy-storing weighted flywheel 55 of appropriate mass to accomplish its intended purpose as a driver for the generator of system 10, later described. Clutch 54 is operatively connected on fan shaft 38 between the bearings 48 and 53; the output shaft 54' of the clutch in effect representing a special extension of shaft 38; and flywheel 55 is fixed axially and rotatively on the clutch's overrunning shaft 54' between bearing 53 and another similar heavy duty bearing 56. The latter is weld-supported through the agency of a pair of heavy gauge bracket plates 57 welded at 58 on top of the angular-merged chassis channels 43.

The rear of right-hand end (FIGS. 2 and 3) of the fan-clutch-flywheel output shaft 54' has fixed thereon a relatively small diameter sprocket 59 driving a larger diameter sprocket 60 on the shaft of a generator typically located about 8 inches – 10 inches directly therebeneath. The drive is through a chain 61 trained about these two sprocket members. The relative sprocket diameters are such that lower, generator drive sprocket 60 will be driven at a rotative speed of, say, half that of the speed of rotation of fan 34. This geared-down reduction protects against overspeeding of both the fan structure and the generator of the system.

It will be appreciated to the extent presently described that in the normal over-the-road traverse of the vehicle, both on a level or an upward incline, the fan 34 will drive generator 62 at a geared-down speed ratio to charge the batteries of the vehicle at a predetermined amperage rate as electrical energy is expended by those batteries in so driving the car. This involves the fixed rigid rotative driving connection of fan, flywheel 55 and generator 62 through the then rotatively fixed agency of overrunning clutch 54. However, should the motion of the vehicle be braked to a halt, or should the expenditure of battery energy be no longer required, as in descending an incline, the drive of generator 62 will nevertheless continue for a period of greater or lesser duration; and the flywheel output shaft 54' will continue in rotation despite termination of operation of the fan structure. The flywheel 55, as now de-clutched from the fan and fixedly connected to said output shaft only will overrun and drive the generator. Other situations in which the operation of a continued recharging battery voltage in a regenerative way are hereinafter discussed.

The generator 62, rated at 100 amperes and 240 volts, is supported by parallel pairs of frame cross-plate members 66 and 67 weld-connected to the chassis channels 44 to hang the generator from beneath the chassis at the indicated 8 inches – 10 inches axial spacing from the frame 41'. Cross-chassis plate 68 serves as a support for the electrical drive motor 69.

That motor has its driven shaft connected to a forward universal joint 70 of a propeller shaft 71 which is rearwardly connected through a second universal joint 72 (FIG. 4) with a conventional differential drive unit 73 through which the conventional driving of the rear drive shaft or axle 74 is obtained. A front drive is of course possible.

The physical batteries of system 10, typically as shown twenty in number for long distance vehicle drive before requiring external recharging, are of the conventional 12-volt lead-acid type having a capacity of approximately 80 ampere hours (20 hour rate). They are wired in series, each being generally designated by the reference number 75. They are well supported on the frame cross plate or bracket sub-structure previously described, and are apportioned in location for an optimum distribution of their weight, taking into consideration that of the vehicle occupants, the location of other weighty components, etc. As suggested in FIG. 2, there will be two sets of two each of the batteries 75 spanning the front-to-rear space between generator 62 and motor 69; with two sets of eight apiece each straddling the drive axle 74. The distribution of battery weight is also illustrated schematically in FIG. 9.

Figure 9:
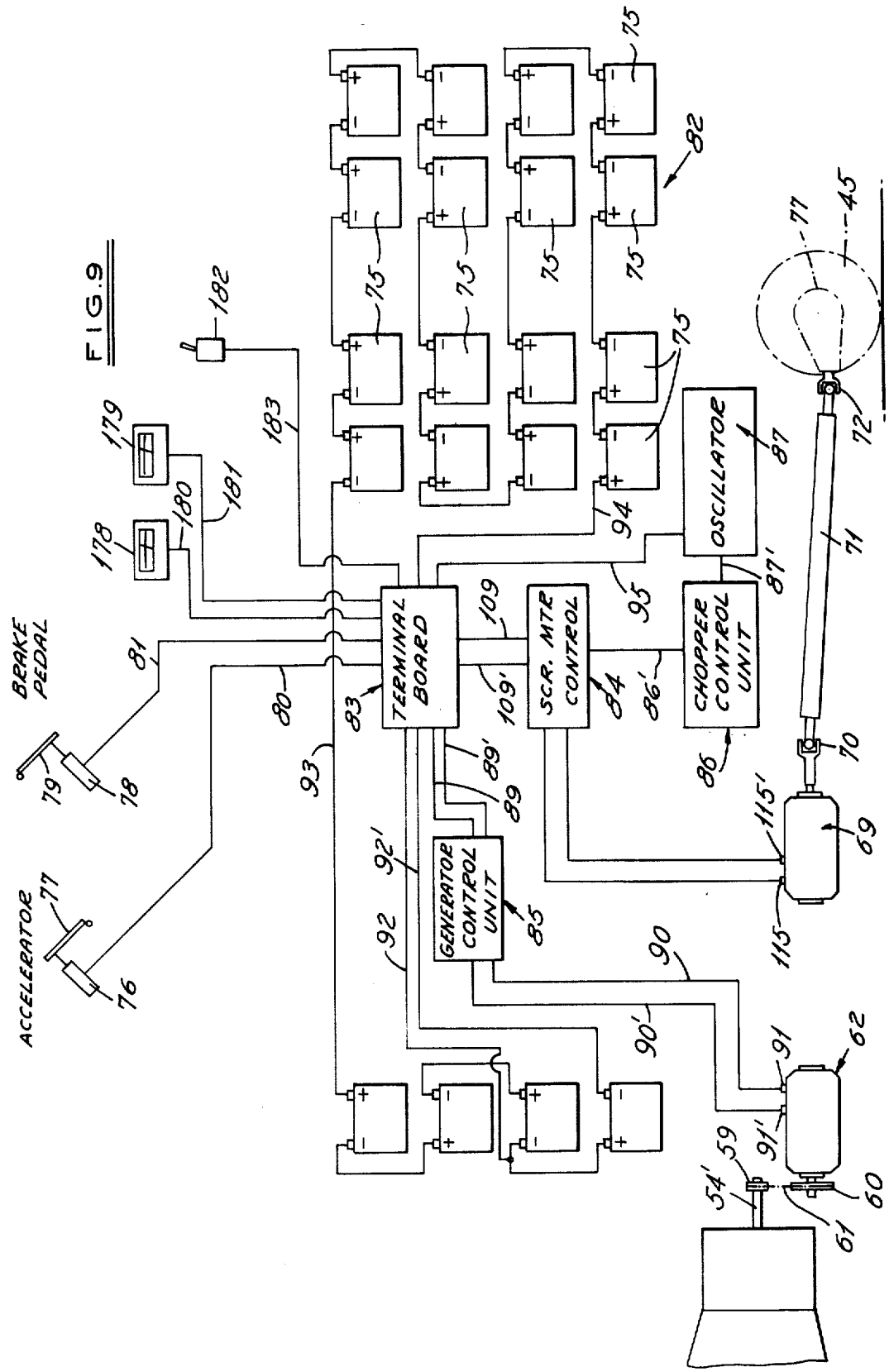
FIG. 9 is a comprehensive schematic wiring diagram showing control parts and electrical connections of the system as a whole.

That figure schematically illustrates a potentiometer 76 under the control of the operator's accelerator pedal 77, and a brake potentiometer 78 is similarly controlled by the brake pedal 79; the potentiometers being in electrically wired connection through the respective leads 80, 81 with the comprehensive wiring lay-out of the improved battery recharge system 10, such electrical lay-out or system being generally designated in FIG. 9 by the reference numeral 82.

As for its essential operating components, the circuitry of FIG. 9 includes a terminal board 83 of an entirely conventional design and manufacture well known in the field; a silicon controlled rectifier unit 84, also of conventional character, such as Westinghouse type 2N3884-2N3894, as catalogued as of Oct. 19, 1965, rated forward 275 amperes root mean square, 175 amps half-wave average and forward blocking voltages to 1,000 volts, the unit 84 being later described as detailed in FIG. 11; a generator control unit or voltage regulator 85, hereinafter described particularly in reference reference to FIG. 10; a transistor and multi-vibrator type chopper control unit 86, later dealt with generally in reference to FIG. 12, as electrically connected to the SCR unit 84 by conductor means 86'; and an oscillator 87 supplying the unit 86, whose circuit appears in FIG. 13. Wiring 87' connects the oscillator to chopper control unit 86.

Electrical leads 89, 89' connect generator control unit 85 with appropriate battery terminals of the board 83, this unit 85 in turn being connected by leads 90, 90' with polar terminals 91, 91' of the D.C. generator 62, which is rated at 100 amperes and 240 volts.

Two other taps of terminal board 83 are connected by conductors 92, 92' with respective individual negative terminals of two successive ones of the series-connected batteries 75 of the four-component forward battery set or bank of the installation, with a conductor 93 tying the plus terminal of an end-most one of this battery bank to the negative terminal of an end-most of the other, 16-component battery bank. A further electrical lead 94 connects the plus side of the opposite end-most battery of said 16-component set with an appropriate battery terminal of board 83, and yet another lead 95 goes from a 12-volt terminal of board 83 to oscillator circuit 87.

Figure 10:
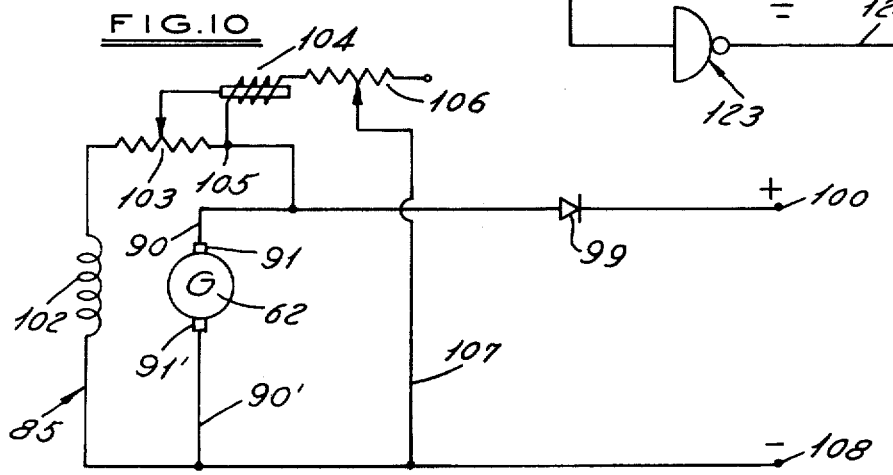
FIG. 10 is a schematic wiring diagram of the generator regulator or voltage control unit shown in black box in FIG. 9.

As illustrated in FIG. 10, the circuit of control unit 85 (as designated by the same numeral) is wired across the terminals 91, 91' of the generator 62 through the respective leads 90, 90', thence from the terminal 91 through a diode rectifier 99 to a plus battery supply terminal at 100 of the comprehensive battery system 82. The generator shunt field 102 of regulator circuit 85 is parallel-connected across the generator terminals in a circuit including a variable resistor 103 whose contactor is variably controlled upon energization of a solenoid 104, the coil of which is connected between a tap 105 to generator terminal 91, and the winding of a voltage potentiometer 106. The slider of the latter has an electrical connection through a lead 107 to the opposite generator terminal 91 to the minus battery power supply terminal at 108 of the overall battery 82 lay-out of FIG. 9. Terminals 100 and 108 are to be considered as electrically connected to said battery system 82 by the conductors 89, 89' going to control board 83.

Figure 11:
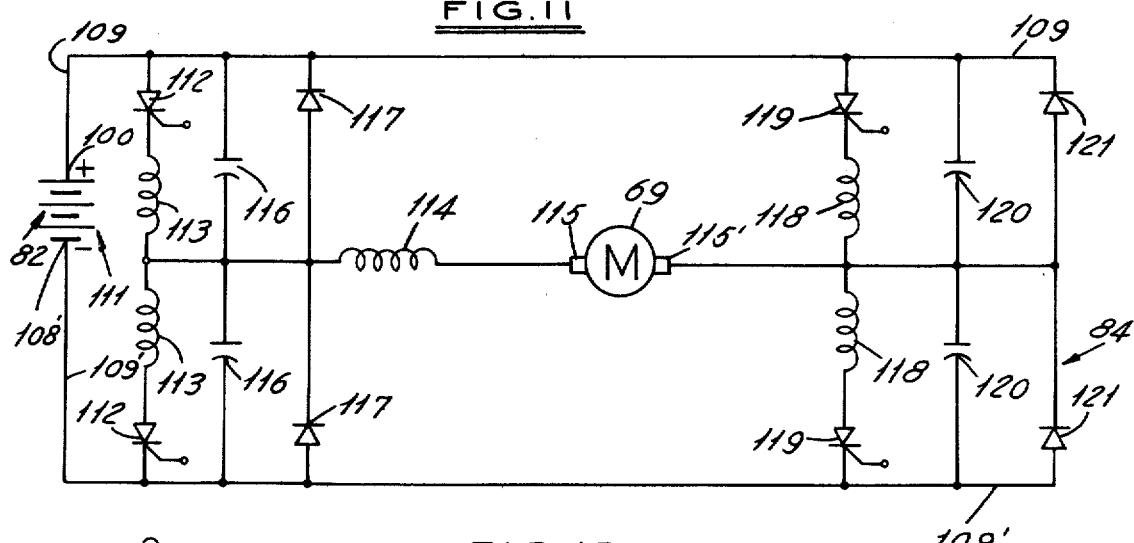
FIG. 11 is a similar schematic showing features of a silicon controlled rectifier and motor chopper sub-circuit also appearing in FIG. 9.

The circuit of the motor control unit 84 of FIG. 9 is shown in detail in FIG. 11, being generally designated by the same reference numeral. It includes leads 109, 109' (see also FIG. 9) respectively connected to plus and minus terminals 100' and 108' of the system 82 of batteries 75, i.e., through terminal board 83 in the same way the voltage regulator supply leads have their corresponding connection to terminals 100, 108 (FIG. 10).

A pair of like silicon rectifiers 112, identified above as to model, have opposite electrode connections to the respective battery conductors 109, 109', as they are also at their other respective electrodes to a pair of like connected inductive coils 113, between which pair a connection is made from a center tap through the inductor coil 114 to one terminal 115 of the motor 69. The latter is typically a 25 HP industrial D.C. unit operating at the 240 volt capacity of the electrical system 82. The inductor 114 is also center-connected in common between a pair of capacitors 116 and a pair of diode rectifiers 117, said pairs being wired in the manner shown in FIG. 11 to the respective leads 109, 109' of the control and motor chopper drive circuit 84. The inductive-capacitative-rectifying arrangement thus far described constitutes a forward drive network of said circuit.

The second terminal 115' of motor 69 has electrical connections to conductors 109, 109' through pairs of series-connected coils 118 and oppositely wired silicon rectifiers 119, as well as through a parallel pair of capacitors 120 to said leads, and through a pair of diode rectifiers 121 to the same leads. This coil, capacitor and arrangement represents a reverse drive network of the SCR control and D.C. motor chopper drive circuit 84.

The transistorized multi-vibrator chopper control unit 86 shown in black box in FIG. 9 has circuitry as appears in FIG. 12, indicated generally by the same reference numeral, in which the oscillator unit 87 of FIG. 13, later described in detail, is wired. Circuit 86 includes a conventional grounded multi-vibrator unit 122 connected through an operational amplifier 123 and leads 124 and 124' to the circuit 86 of said oscillator.

Control of square wave input impulses originating in and forwarded by units 87 and 122 includes a connection of one terminal of the multi-vibrator 122 to a positive 12-volt D.C. battery terminal 126 of electrical system 82, while another terminal of unit 122 has wiring connection to the parallel-connected accelerator pedal potentiometer 76 and the brake pedal potentiometer 78. A positive 5-volt logic bias potential is applied from a battery tap 127 through a 56,000-ohm resistor 128 to terminals of these two potentiometers, which are 500K ohms each; and a 1-microfarad capacitor 129 connects between the potentiometer terminals and a multi-vibrator terminal.

Figure 12:
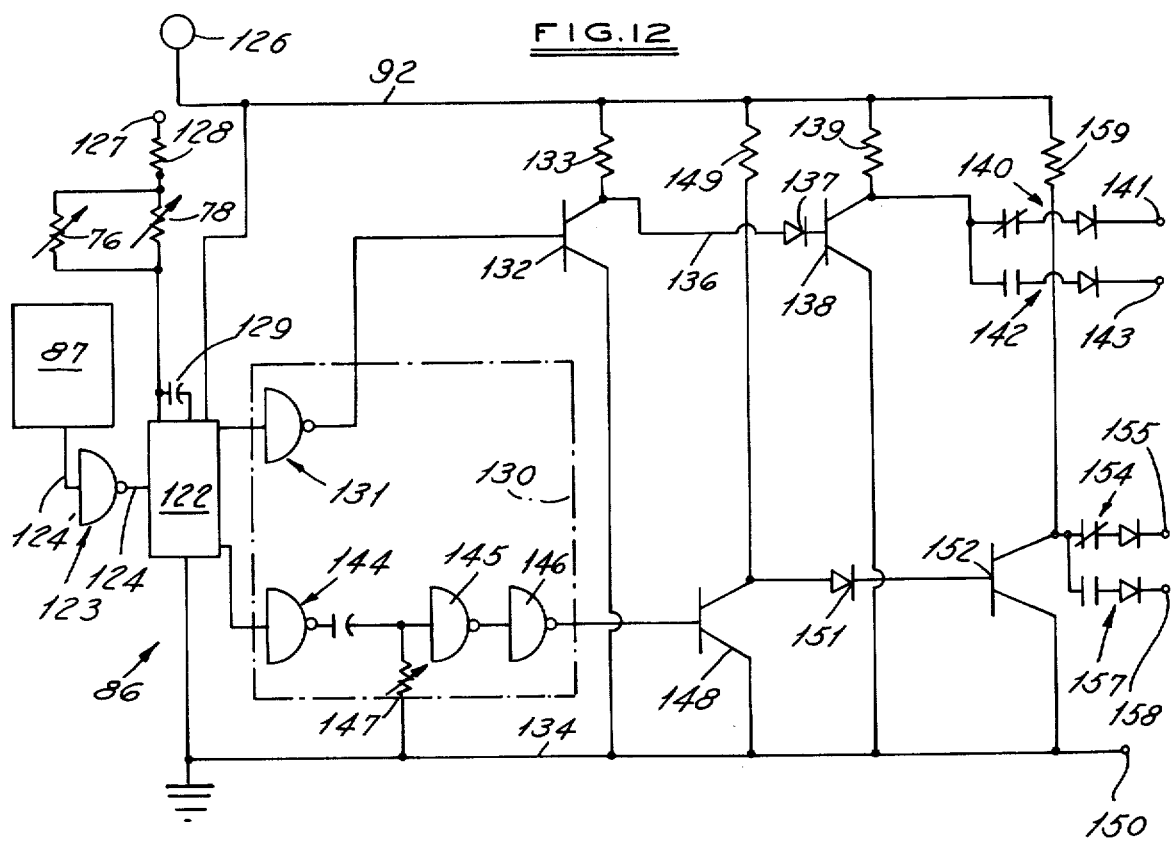
FIG. 12 schematically shows circuitry of a transisterized chopper control unit of FIG. 9.

As shown in FIG. 12, a pair of generally similar transistor and rectifier "on and off" circuits, parts of which are incorporated in the dot-dash depicted conventional integrated circuit chip 130, are connected to the pulse output of multi-vibrator 122. One of these includes an operational amplifier 131 supplying the base of a standard transistor 132, whose emitter electrode connects through a 220-ohm resistor 133 with the plus battery lead 92, and whose collector is connected to a ground terminal line 134 of multi-vibrator unit 122. The transistor's collector also connects through a lead 136 to a diode rectifier 137 series-connected to the base of a second standard transistor 138. The latter's emitter is wired through a 10-ohm resistor 139 to positive 12-volt battery lead 92.

The emitter of transistor 138 also has parallel connections through a variable capacitor and rectifier subassembly or unit 140 to a gate 141 of the on or forward drive SCR network of circuit 84 of FIG. 11; another parallel emitter connection is through a second fixed capacitor and rectifier unit 142 to the gate 143 of the reverse on drive SCR network.

The second or off section of the output of multi-unit 122 includes an operational amplifier 144 connected in series with further operational amplifier 145 and 146 of integrated circuit chip 130, with a 10K ohm variable resistor 147 connected from a tap between amplifier 144 and the units 145, 146 to the ground line 134 of circuit 86. The last named pair connect in series to the base of a standard transistor 148, whose emitter connects through a 220-ohm resistor 149 to the positive battery lead 92. The collector of transistor 148 is wired to the grounded line 134, which connects to the cathode terminal 150 of the on silicon controlled rectifier circuit.

The emitter of transistor 148 has further connections through the series-connected diode rectifier 151 and transistor 152, to the off SCR gates. These are in parallel, one of which includes a variable capacitor and series-rectifier unit 154 between the emitter of transistor 152 and a gate 155 of the off SCR wiring, and the other which has a fixed capacitor and rectifier unit 157 going to gate 158 of the reverse off SCR wiring. In common with these last two parallel capacitor-rectifier gate connections, the emitter or transistor 152 connects through a 10-ohm resistor 159 to 12-volt battery lead 92. The collector is wired to negative line 134 and SCR cathode terminal 150.

Figure 13:
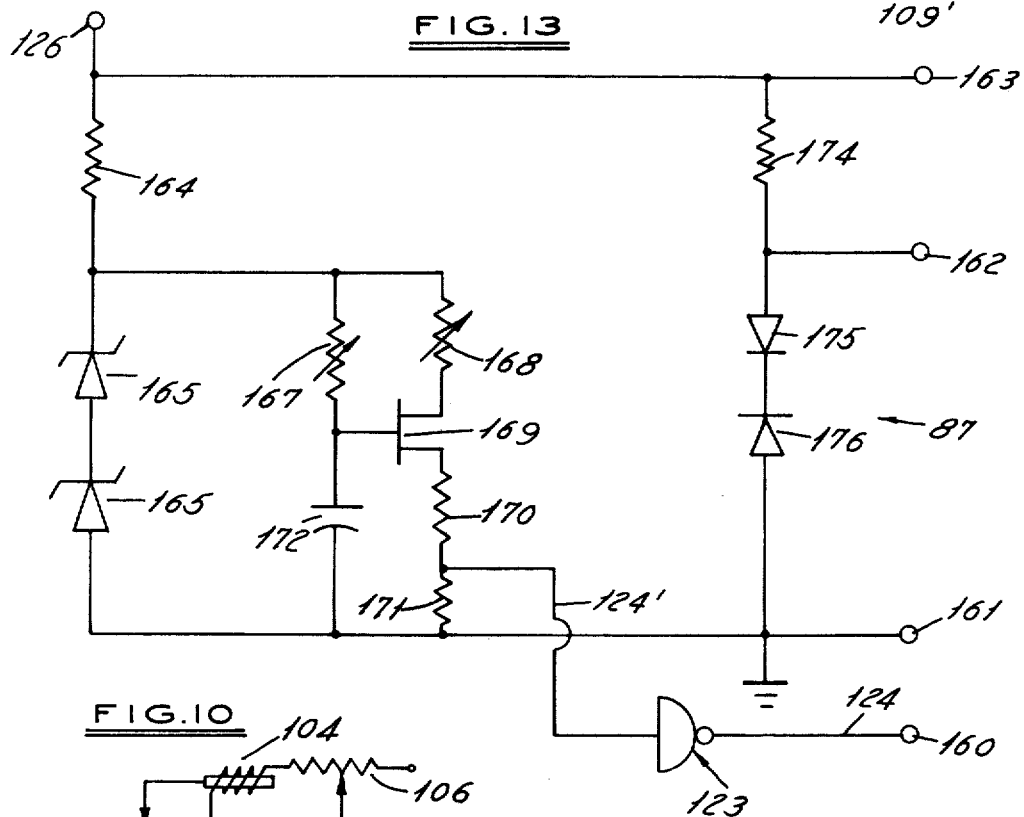
FIG. 13 correspondingly diagrams the components and wiring of the FIG. 9 oscillator unit.

The oscillator circuit 87 is shown in FIG. 13 to include the operational amplifier 123 of chopper control circuit 86 of FIG. 12, the latter as wired to a terminal 160 of multi-vibrator 122; and wiring leads of circuit 87 are respectively connected to a logic ground terminal 161, to a terminal 162 affording a positive 5-volt logic bias, and to a positive 12-volt terminal 163. The circuit 87 supplies through a 91-ohm resistor 164 a positive 11 volts, as governed by a pair of series-connected 5.5 volt unidirectional diode voltage regulators 165, and this 11-volt output is applied to paralleled 20,000 and 1,000-ohm variable resistors 167, 168, respectively. The former of these connects to the base of a field effect transistor 169, to the emitter of which resistor 168 is wired. The collector voltage is controlled by series-connected 27-ohm and 39-ohm resistors 170, 171, the latter of which connects to logic ground terminal 161; and the lead 124' of the operational amplifier connection of multi-vibrator 122 taps to a point between resistors 170, 171. A 1-microfarad capacitor 172 controls current applied to the base of the field effect transistor 169.

The circuit 87 is completed by a positive 12-volt conductor 173 linking the terminals 126 and 163, between the latter of which and the positive 5-volt bias terminal 162 a second 91-ohm resistor 174 is connected. A second pair of series-connected unidirectional diode voltage regulators 175, 176 is interposed between resistor 174 and the logic ground terminal 161.

The comprehensive wiring lay-out of FIG. 9 shows a standard voltmeter 178 and a standard ammeter 179, both visible on an instrument panel to the vehicle operator, as respectively connected by conventionally shown lead means 180, 181 to terminals of board 83, also a reverse control on - off switch 182 similarly connected by lead means 183 to said terminal board.

Figure 14:
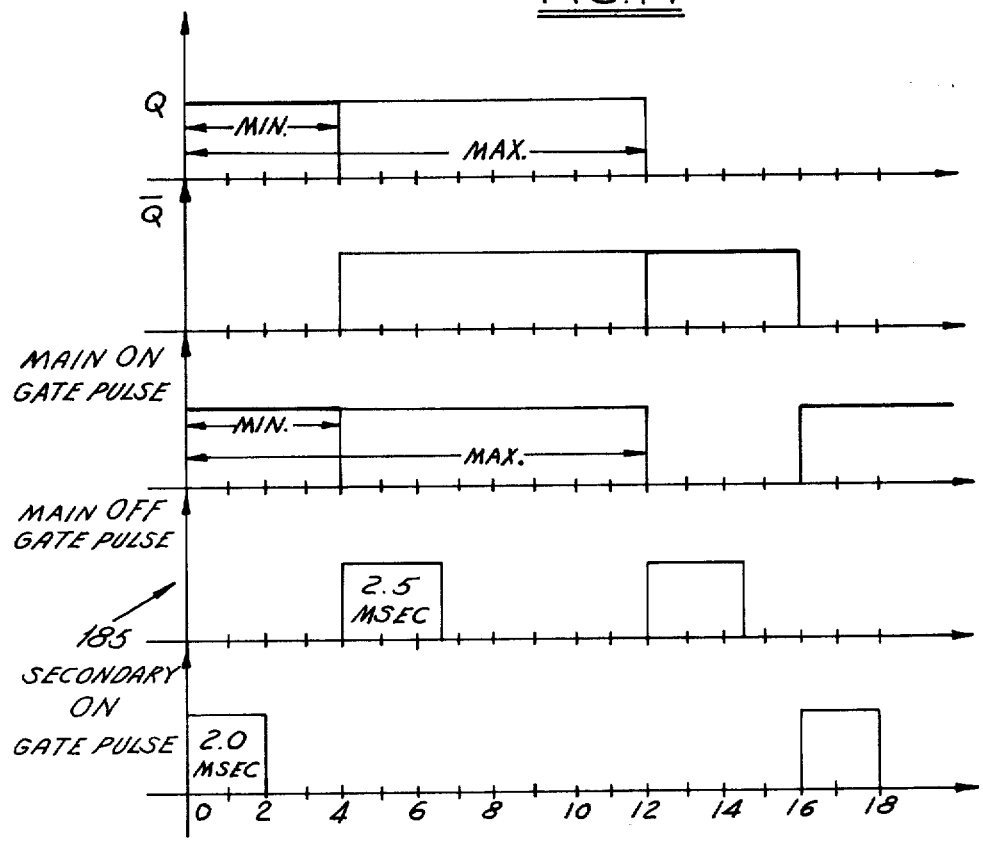
FIG. 14 is a timing diagram depicting the pulse output of the SCR and motor chopper unit of FIG. 11.

The timing diagram 185 of FIG. 14 conventionally depicts the scheme of minimum and maximum square wave pulses derived through oscillator 87 and multivibrator 122 over a period of 16 milli-seconds at a frequency of 62.5 cycles per second in a duty cycle approximating 25–75%, with a minimum pulse of 4 milli-seconds and a maximum pulse of 12 milli-seconds.

Figure 15:
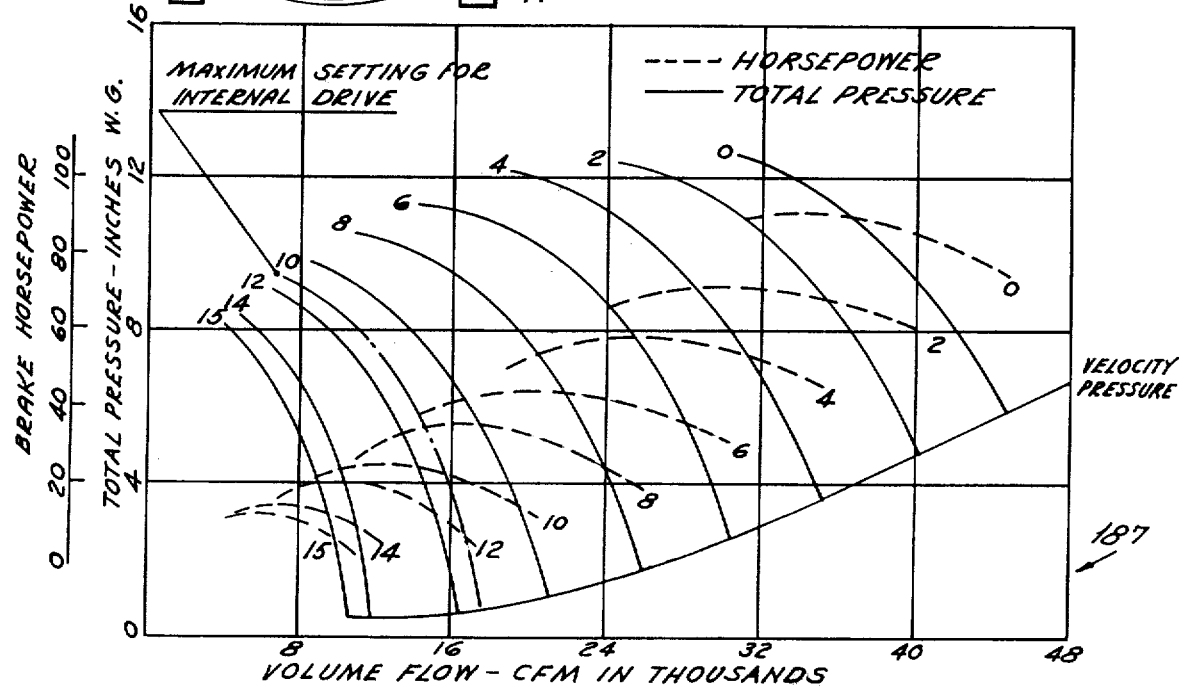
FIG. 15 is a graph showing typical volume flow curves characteristic of the fan of the system.

The curves of the typical operational graph 187 of FIG. 15 plot volume flow of the fan 32 against total pressure and brake horsepower. These data represent the operation of a model 29¼-14-3450 series 1000 Axivane fan of the producer, Joy Manufacturing Company, with No. 0 to No. 15 blade settings, an air density of 0.075 lbs. per cubic foot with the fan blowing into a 29.25 inch diameter fan housing structure 31.

The operation of the battery charging system 10 has previously been described primarily in terms of vehicle normal road or uphill travel, or a halt thereafter, in which flywheel 55 delivers its positively driven or inertial power to generator 62. In both this mode or a regenerative braking mode, as in coasting or downhill operation, electrical power to the motor 69 is turned on and off under high speed switching as performed by the D.C. chopper circuit 86 and the SCR circuit 84, which system operates with but a minimum of control power without arcing or mechanical movement. In the regenerative coasting or braking regeneration mode, the supply voltage of battery system 82 is turned on and off at a controlled rate to vary the average current and voltage supplied to motor 69 or to the batteries 75 during regeneration.

The two primary controls to this end are the accelerator and brake potentiometers 76 and 78, respectively, which control the frequency rate output of the transistor chopper control system 86 of FIG. 12. Thus, a separate switch means such as the reversing switch 182 (FIG. 9) mounted on the vehicle instrument panel is used to turn on power to the 12-volt D.C. control circuit, and to provide switching for D.C. motor 69 for vehicle-powered reverse operation in which the automobile drives the motor as a generator through the shaft or axle 74, differential 73 and propeller shaft 71.

Normal power requirements of the motor 69 are furnished by the battery power supply system 82 until forward vehicle speed suffices to initiate flywheel-applied fan torque. The D.C. generator 62 will then supply power back to the batteries 75, thereby reducing the battery requirements for vehicle propulsion.

Whenever the accelerator pedal 77 is in a maximum up, coasting or downhill position, drive motor 69 will go into the regenerative mode, the amount of regeneration being controlled by brake pedal potentiometer 78 in regulating the chopper frequency,. A downward movement of brake pedal 79 will increase the chopper frequency, which in turn increases the regeneration braking effort. Further downward movement of brake pedal 79 will overtravel the brake potentiometer 78 and conventionally actuate the vehicle's hydraulic brake system. Thus the regenerative braking system recovers a major portion of the kinetic energy of the moving vehicle.

In addition to standard speedometer and light-switch means, plus the forward and reverse on - off switch control 182, the instrument panel of the vehicle will preferably mount a tachometer indicating the r.p.m. of fan 32 and a battery charge condition dial, neither of which are shown.

What is claimed is:

1. An electrical power system for driving an automotive vehicle, comprising a large capacity air scoop opening forwardly of a forward portion of said vehicle, said scoop being proportioned and acting to trap and assist in directing rearwardly through the scoop an air stream in a convergently restricted rearward path, an operator fan disposed rearwise of said air scoop and rotatively driven by said air stream on a forward-rearward axis, said fan comprising but a single stage of circumferentially spaced blades extending on individual axes radial of said fan axis, said stage being disposed in its entirety in a limited axial zone just to the rear of said scoop and closely adjacent said forward vehicle portion, and means for adjusting the angular pitch of said blades about said respective individual axes, a rotative generator, electrical battery means wired to said generator to be charged by the latter in the normal vehicle travel, an electrical motor driven by said battery means and operatively connected to traction means of said vehicle to propel the latter in said travel, a bumper structure extending relatively rigidly across the front of the vehicle just forwardly of said air scoop, said structure including a plurality of parallel rigidly connected bumper components spaced sufficiently from one another to afford distinct parallel openings of substantial size for an air inlet capacity to said scoop which is comparable in area to that of the forward tranverse area of the scoop, said bumper components being horizontal and at least two in number, and defining a vertically intermediate opening of major area forward of the fan axis and openings of lesser area above and below said intermediate opening, electrical circuitry operatively connecting said generator, battery means and motor, said circuitry including means affording a high frequency voltage supply switching connection between said generator and said battery means and motor enabling the battery means to be regeneratively energized during a travel mode in which the vehicle is rotatively driving the motor, as well as in a normal mode in which the motor is battery-powered for travel of the vehicle, an energy storing flywheel drivingly connected to said generator to rotate the latter and rotatively driven by said operator fan in the normal vehicle travel, and automatically releasable coupling means operatively interposed between said flywheel and operator fan, said coupling means normally driving said flywheel from said fan, said coupling means acting to operatively disconnect the same during continued rotation of said generator by said flywheel.

2. The system of claim 1, and further comprising speed changing means operatively connecting said energy storing flywheel with said generator to drive the latter at a different rotative speed than that of said flywheel.

3. The system of claim 1, in which said large capacity air scoop is provided with walls, certain walls of which converge rearwardly of the direction of said air stream, said operator fan having said blades enclosed in an axially extending housing, said scoop walls merging convergently with forward portions of said housing.

4. The system of claim 1, in which said circuitry comprises electrical devices governed respectively by accelerator and brake units of the vehicle to control said switching connection.

5. The system of claim 1, in which said circuitry comprises electrical devices governed respectively by accelerator and brake units of the vehicle to control said switching connection, and other switch means selectively conditioning said circuitry for selective operation in said normal and regenerative modes.

\* \* \* \* \*